United States Patent
Li

(10) Patent No.: US 10,108,331 B2
(45) Date of Patent: Oct. 23, 2018

(54) METHOD, APPARATUS AND COMPUTER READABLE MEDIUM FOR WINDOW MANAGEMENT ON EXTENDING SCREENS

(71) Applicant: Wistron Corporation, New Taipei (TW)

(72) Inventor: Sunny MX Li, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 924 days.

(21) Appl. No.: 14/250,392

(22) Filed: Apr. 11, 2014

(65) Prior Publication Data

US 2015/0186016 A1 Jul. 2, 2015

(30) Foreign Application Priority Data

Dec. 30, 2013 (CN) .......................... 2013 1 0745802

(51) Int. Cl.
*G06F 3/0484* (2013.01)
*G06F 3/0488* (2013.01)

(52) U.S. Cl.
CPC ........ *G06F 3/0488* (2013.01); *G06F 3/04847* (2013.01)

(58) Field of Classification Search
CPC ........................... G06F 3/0488; G06F 3/04847
See application file for complete search history.

(56) References Cited

U.S. PATENT DOCUMENTS

2011/0193805 A1 8/2011 Park et al.
2013/0132885 A1* 5/2013 Maynard ............. G06F 3/04842
715/777

FOREIGN PATENT DOCUMENTS

TW 201106166 2/2011
TW 201117072 5/2011
TW I364699 5/2012

OTHER PUBLICATIONS

"Office Action of China Counterpart Application," dated May 2, 2017, with English translation thereof, p. 1-19.

* cited by examiner

*Primary Examiner* — Jennifer N To
*Assistant Examiner* — Joseph R. Burwell
(74) *Attorney, Agent, or Firm* — JCIPRNET

(57) ABSTRACT

A method, an apparatus and a computer readable medium for window management of multiple screens are provided. In the method, an external screen is detected and connected. A first touch operation performed on a window displayed on a touch screen is received. The window is moved to the external screen and displayed on the external screen according to the first touch operation, and a window management panel is displayed on the touch screen, where the window management panel includes a window icon corresponding to the window moved to the external screen. A second touch operation performed on the window icon is received, and the window moved to the external screen is controlled accordingly.

17 Claims, 6 Drawing Sheets

METHOD, APPARATUS AND COMPUTER READABLE MEDIUM FOR WINDOW MANAGEMENT ON EXTENDING SCREENS

CROSS-REFERENCE TO RELATED APPLICATION

This application claims the priority benefit of China application serial no. 201310745802.0, filed on Dec. 30, 2013. The entirety of the above-mentioned patent application is hereby incorporated by reference herein and made a part of this specification.

BACKGROUND

Technical Field

The invention relates to a method and an apparatus for window management. Particularly, the invention relates to a method and an apparatus and a computer readable medium for window management of multiple screens.

Related Art

Along with development of technology, electronic apparatuses such as smart phones, tablet PCs, are widely used, and a touch technique applied in the above electronic apparatuses provides rich and user-friendly human-computer interaction.

Due to a special need in daily life, a user probably needs to open a plurality of windows and displays the windows on different screens. Now, the user can connect the external screens to the electronic apparatus, and move a part of the opened windows to the external screens and display the same on the external screens by using an extended screen mode provided by the electronic apparatus, so as to implement simultaneous display of multiple windows.

However, regarding the electronic apparatus using a touch screen as an operation tool, an operation range thereof is only limited to the display range of the touch screen, which is not as good as the conventional operation method that is capable of extending the operation range to the external screen by using a mouse or a touch pad. As a result, it generally causes difficulty and inconvenience in user's operation. Especially, when the external screens do not have the touch function, the user cannot control the windows displayed on the external screens. Therefore, it is necessary to provide an effective method to control and manage the windows displayed on the touch screen and the external screens thereof.

SUMMARY

The invention is directed to a method, an apparatus and a computer readable medium for window management of multiple screens, by which windows moved to and displayed on external screens can be controlled and managed through touch operations.

The invention provides a method for window management of multiple screens, which is adapted to an electronic apparatus having a touch screen. In the method, an external screen is detected and connected. When a first touch operation performed on a window displayed on the touch screen is received, the window is moved to the external screen for displaying according to the first touch operation, and a window management panel is displayed on the touch screen, where the window management panel includes a window icon corresponding to the window moved to the external screen. Thereafter, a second touch operation performed on the window icon is received, and the window moved to the external screen is controlled accordingly.

In an embodiment of the invention, the step of moving the window to the external screen for displaying according to the first touch operation and displaying the window management panel on the touch screen includes these following steps. An edge of the touch screen located on a moving direction of the first touch operation is determined, and the window management panel is displayed at the edge of the touch screen.

In an embodiment of the invention, the step of moving the window to the external screen for displaying according to the first touch operation and displaying the window management panel on the touch screen includes a following step. The external screen is set as an extending screen extending out from the edge of the touch screen.

In an embodiment of the invention, the window icon includes a plurality of control buttons used for controlling the window, and the step of receiving the second touch operation performed on the window icon, and accordingly controlling the window moved to the external screen includes these following steps. A selection operation performed on one of the control buttons in the window icon is received, and a control function corresponding to the selected control button is executed to the window.

In an embodiment of the invention, the control function includes minimization, zoom in, zoom out, moving or closing.

In an embodiment of the invention, the step of receiving the second touch operation performed on the window icon, and accordingly controlling the window moved to the external screen includes these following steps. A first drag operation for dragging the window icon from the inside of the window management panel to the outside of the window management panel is received, and the window is moved back from the external screen to the touch screen.

In an embodiment of the invention, the step of receiving the second touch operation performed on the window icon, and accordingly controlling the window moved to the external screen includes these following steps. A second drag operation for dragging the window icon within the window management panel is received, and the window is correspondingly moved according to a dragging trajectory of the second drag operation.

In an embodiment of the invention, the method further includes these following steps. A plurality of external screens are detected and connected, and a screen management panel is displayed on the touch screen, where the screen management panel includes a plurality of screen icons corresponding to the external screens. A third touch operation performed on one of the screen icons is received to switch the external screen corresponding to the selected screen icon to be a currently operable extending screen of the touch screen, where the screen management panel is displayed at an edge of the touch screen that is the same or opposite to that of the window management panel.

In an embodiment of the invention, the step of detecting and connecting the external screen further includes detecting and connecting a plurality of external screens, and the step of moving the window to the external screen for displaying according to the first touch operation and displaying the window management panel on the touch screen includes these following steps. A plurality of screen icons corresponding to the external screens are displayed in the window management panel, and the window icon corresponding to the window moved to the external screen is displayed in the screen icon corresponding to each of the external screens.

In an embodiment of the invention, the step of receiving the first touch operation performed on the window displayed on the touch screen includes receiving the first touch operation performed to a title bar, a state bar, an edge, a corner or a function button of the window displayed on the touch screen.

In an embodiment of the invention, the first touch operation includes a single click operation, a double click operation, a long press operation or a drag operation executed by a single finger or multiple fingers.

The invention provides an electronic apparatus including a touch screen, a storage unit and one or a plurality of processing units. The storage unit is configured to record a plurality of modules. The processing unit is coupled to the storage unit for accessing and executing the modules recorded in the storage unit, where the modules include a connection module, a receiving module, a window management module and a control module. The connection module is configured to detect and connect an external screen. The receiving module is configured to receive a first touch operation performed on a window displayed on the touch screen. The window management module is configured to move the window to the external screen for displaying according to the first touch operation, and display a window management panel on the touch screen, where the window management panel includes a window icon corresponding to the window moved to the external screen. The control module is configured to receive a second touch operation performed on the window icon, and accordingly controls the window moved to the external screen.

The invention provides a computer readable medium, which stores computer programs to be loaded to an electronic apparatus to execute these following steps. An external screen is detected and connected. Then, a first touch operation performed on a window displayed on the touch screen is received. The window is moved to the external screen for displaying according to the first touch operation, and a window management panel is displayed on the touch screen, where the window management panel includes a window icon corresponding to the window moved to the external screen. Thereafter, a second touch operation performed on the window icon is received, and the window moved to the external screen is controlled accordingly.

According to the above descriptions, in the method, the apparatus and the computer readable medium for window management of multiple screens, the window is moved to and displayed on the external screen through the touch operation, and the window displayed on the external screen is controlled through the window management panel in the touch screen. By using advantages of simple and intuition of touch technique, window management of the external screen is realized and user's operation experience is improved.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Regarding an electronic apparatus using a touch screen as an operation tool, an operation arrange thereof is only limited to a display range of the touch screen. Regarding the content displayed on an external screen of the electronic apparatus, the user can perform operations on the content only through the touch screen. In order to implement operation and control of two screens (i.e. the touch screen and the external screen) through a same touch screen, according to the embodiments of the invention, besides that a touch operation of a specific gesture is designed to facilitate a user to move a window to the external screen, a window management panel is further displayed on the touch screen, and a window icon corresponding to the window moved to the external screen is displayed on the window management panel, such that the user can perform operations on the window icon to correspondingly zoom in, zoom out and move the window displayed on the external screen. Moreover, when the touch screen is connected to a plurality of extending screens, the user can switch the extending screens through touch operation, and control and manage the window displayed on each of the extending screens. Furthermore, according to the embodiments of the invention, window management of the external screen can be implemented through the touch technique, so as to improve the operation experience of the user.

Figure 1:
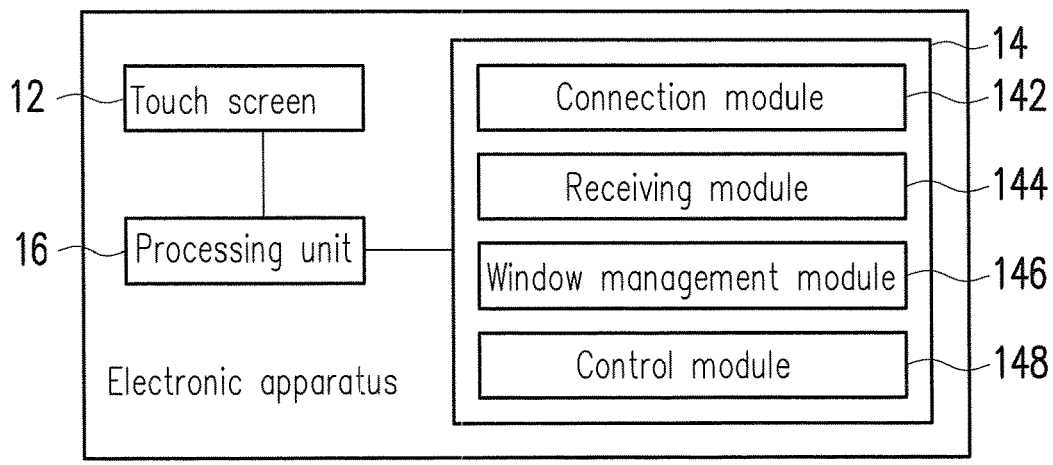
FIG. 1 is a block diagram of an electronic apparatus according to an embodiment of the invention.

FIG. 1 is a block diagram of an electronic apparatus according to an embodiment of the invention. Referring to FIG. 1, the electronic apparatus 10 includes a touch screen 12, a storage unit 14 and one or a plurality of processing units 16. The electronic apparatus 10 is, for example, a mobile phone, a smart phone, a tablet PC, a personal digital assistant (PDA), a notebook computer or a digital camera, etc., that has a touch screen (the above electronic apparatuses are all referred to as the electronic apparatus 10 hereinafter), and the type of the electronic apparatus is not limited by the invention.

The touch screen 12 is, for example, a combination of a liquid crystal display (LCD), a light-emitting diode (LED) display, a field emission display (FED) or other types of display and a resistive touch panel, a capacitive touch panel, an optical touch panel or an ultrasonic touch panel, which simultaneously provides a display function and a touch function.

The storage unit 14 can be any type of fixed or movable random access memory (RAM), read-only memory (ROM), flash memory or similar device or a combination of the above devices, and can also be a hard disk drive or a combination of the hard disk drive and any one of the aforementioned memories. In the present embodiment, the storage unit 14 is configured to record a software program such as a connection module 142, a receiving module 144, a window management module 146 and a control module 148. The storage unit 14 of the present embodiment is not limited to be a single memory device, and the aforementioned software modules can be separately stored in two or more memory devices of the same type or different types.

The processing unit 16 is coupled to the storage unit 12. The processing unit 16 can be a central processing unit (CPU), or a programmable general-purpose or special-purpose microprocessor, a digital signal processor (DSP), a programmable controller, an application specific integrated circuit (ASIC) or other similar devices or a combination of the aforementioned devices. In the present embodiment, the processing unit 16 is used for accessing and executing the modules recorded in the storage unit 14 to implement the method for window management of multiple screens of the invention. The processing unit 16 of the present embodiment is not limited to be a single processing device, which can also be two or more processing devices.

Figure 2:
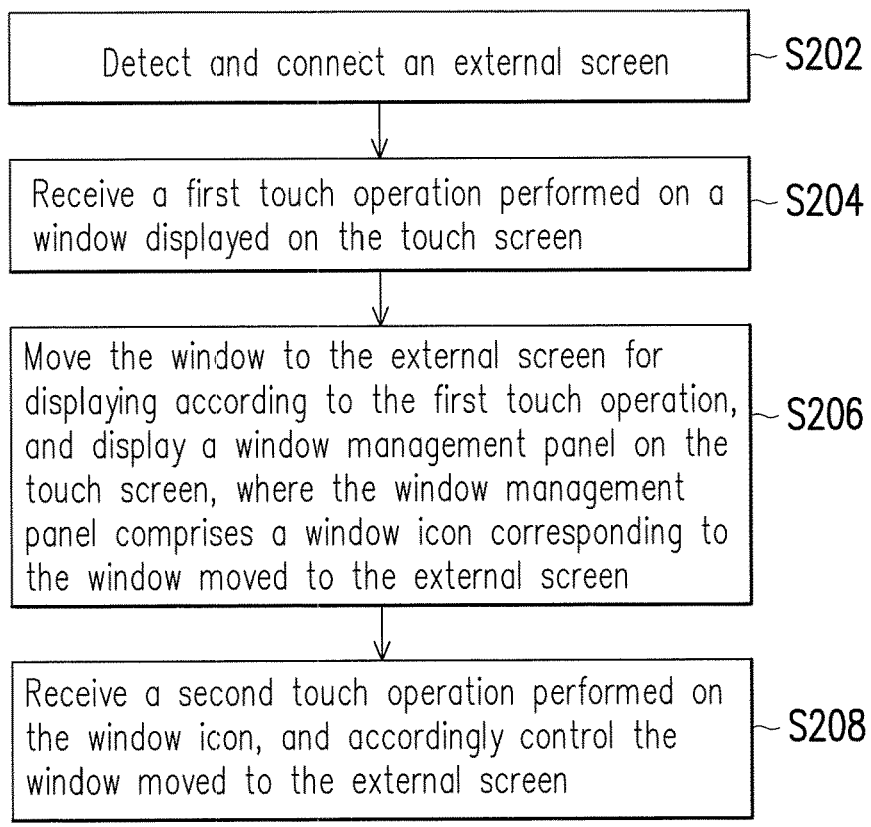
FIG. 2 is a flowchart illustrating a method for window management of multiple screens according to an embodiment of the invention.

FIG. 2 is a flowchart illustrating a method for window management of multiple screens according to an embodiment of the invention. Referring to FIG. 1 and FIG. 2, the method of the present embodiment is adapted to the aforementioned electronic apparatus 10, and a detailed flow of the method of the present embodiment is described below with reference of various components of the electronic apparatus 10 of FIG. 1.

First, the connection module 142 detects and connects an external screen (step S202). In detail, in the present embodiment, the electronic apparatus 10 and the external screen (not shown) can be connected through a physical circuit such as a video graphics array (VGA), a digital video interface (DVI), or a high definition multimedia interface (HDMI), or can be connected through a wireless transmission interface such as bluetooth, or wireless fidelity (WiFi). Moreover, the external screen is similar to the touch screen 12, and can adopt any one of the aforementioned displays. It should be noticed that whether the external screen has a touch function is not limited by the invention.

Then, the receiving module 144 receives a first touch operation performed by the user on a window displayed on the touch screen 12 (step S204). In detail, the receiving module 144 can recognize the window touched by the first touch operation and a gesture of the first touch operation to determine the window to be moved to the external screen. Regarding setting of a touch position, in some embodiments, the receiving module 144 can receive the first touch operation performed on a title bar, a state bar, an edge, a corner or a function button of the window displayed on the touch screen 12. Regarding setting of the type of the touch gesture, in some embodiments, the first touch operation may include a single click operation, a double click operation, a long press operation, a drag operation or other operations and/or a combination thereof executed by a single finger or multiple fingers. The user can provide the combination of different first touch operations and different window positions according to an actual requirement, and as long as the window to be moved to the external screen is learned through the touch operation, it is considered to be within the application scope of the invention.

Figure 3:
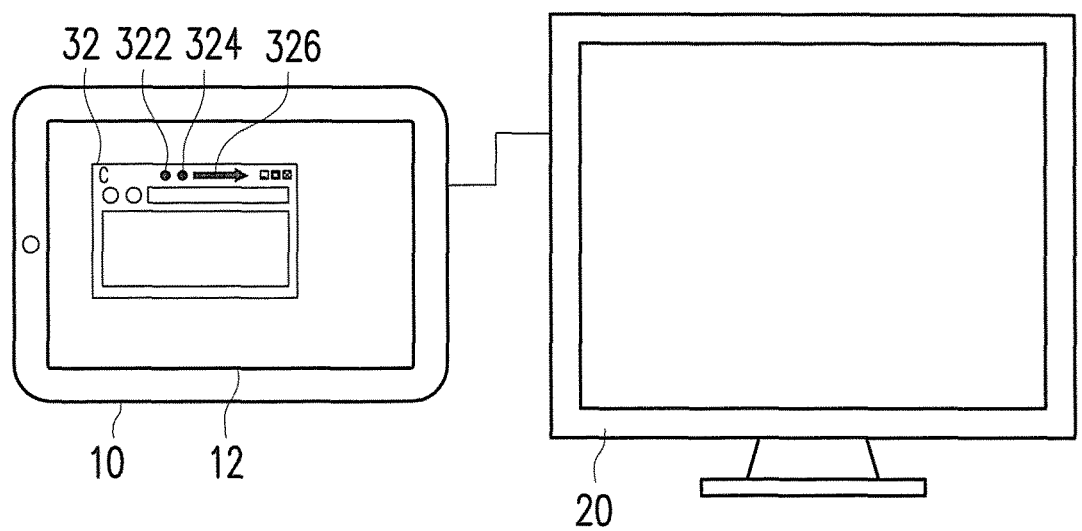
FIG. 3 is an example of the method for window management of multiple screens according to an embodiment of the invention.

For example, referring to FIG. 3, an external screen 20 of FIG. 3 is connected to the electronic apparatus 10, and is disposed at a right side of the electronic apparatus 10. A window 32 is displayed on the touch screen 12 of the electronic apparatus 10, and is adapted to receive a touch operation from the user. In the present embodiment, the first touch operation can be set as that the user touches the top of the window (for example, the title bar) by two fingers closed together, and slides the fingers towards a direction of the external screen. Therefore, when the user touches the title bar of the window 32 by the two fingers, and slides the fingers rightwards according to the position of the external screen 20 relative to the touch screen 12, the receiving module 144 can receive the touch position of the user on the window 32 (touch points 322 and 324 shown in FIG. 3), and obtains a moving direction 326 of the touch operation of the user. The receiving module 144 can determine whether the two fingers of the user are closed together according to whether a distance between the touch points 322 and 324 is smaller than a predetermined interval. Moreover, the receiving module 144 can also determine whether the user wants to move the window 32 to the external screen 20 for displaying or even a direction for extending the screen (i.e. extending rightwards) according to the moving direction 326 of the touch operation. In addition, the receiving module 144 can determine whether the user wants to display the window 32 through the external screen 20 according to whether a moving distance of the touch operation is greater than a predetermined distance. Namely, when the receiving module 144 receives the touch operation of the user, and the distance between the touch points 322 and 324 of the touch operation is smaller than the predetermined interval, the moving direction 326 can extend to the external screen 20, and the moving distance is greater than the above predetermined distance, the above touch operation is determined as the first touch operation used for moving the window 32 to the external screen 20.

It should be noticed that the first touch operation used for moving the window to the external screen can be a gesture of closing up and sliding two fingers. In some embodiments, the first touch operation can also be other specific operation of multiple fingers for separating from commonly used gesture operations (for example, single finger moving or clicking), so as to facilitate recognizing the first touch operation. In other embodiments, the first touch operation can also be a single finger operation (for example, a single finger is used to double click the top of the window), and as long as the corresponding gesture thereof can be distinguished from a general operation of the touch screen 12, the type of the gesture of the first touch operation is not limited by the invention.

Referring to the flow of FIG. 2, after the receiving module 144 receives the first touch operation, the window management module 146 moves the window to the external screen for displaying according to the first touch operation, and displays a window management panel on the touch screen 12 (step S206). The window management panel may include a window icon corresponding to the window moved to the external screen.

It should be noticed that, in an embodiment, after the receiving module 144 receives the first touch operation, the window management module 146 can further display an extending screen setting menu for the user to select or set an extending direction of the touch screen 12, so as to display the window management panel at an edge of the touch screen 12 on the extending direction. In another embodiment, besides that the window management module 146 determines the window to be moved by the user according to the touch position of the first touch operation, the window management module 146 further determines the edge of the touch screen 12 where the first touch operation moves to according to the moving direction of the first touch operation, so as to display the window management panel at the edge of the touch screen 12. However, in other embodiments, the window management panel can also be displayed at other positions of the touch screen 12, and is not limited to the aforementioned position.

Moreover, according to the above edge, the window management module 146 can further determine an extending direction of the screen that the user intends to extend according to the moving direction of the first touch operation, so as to set the external screen as an extending screen extended from the above edge of the touch screen 12. In other words, the window management module 146 determines the extending direction of the touch screen 12 according to a sliding direction of the user's gesture, and displays the window management panel at the edge corresponding to the direction, so as to facilitate the user intuitively controlling the window displayed on the extending screen.

Figure 4:
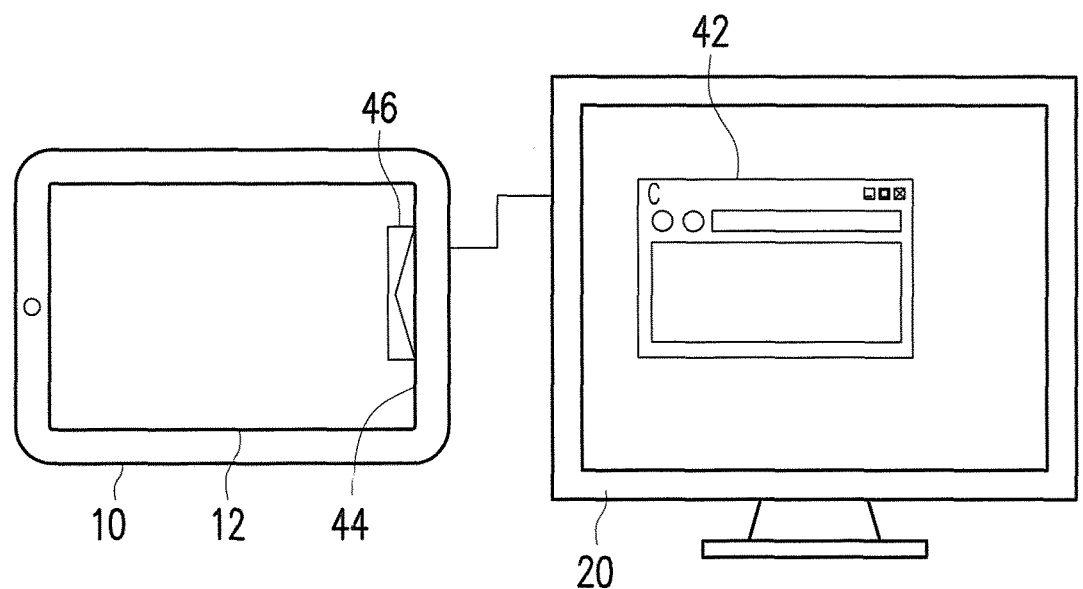
FIG. 4 is an example of the method for window management of multiple screens according to an embodiment of the invention.

For example, referring to FIG. 3 and FIG. 4, FIG. 4 illustrates an implementation that the window management module 146 moves the window 32 to the external screen 20 (i.e. becomes a window 42) and displays a window management panel 46 on the touch screen 12. After the user performs the first touch operation with two fingers closed together and sliding rightwards (corresponding to the touch points 322 and 324 and the moving direction 326) on the window 32, the window management module 146 learns the window that the user intends to move according to positions of the touch points 322 and 324, and determines an extending direction of the touch screen 12 according to the edge 44 of the touch screen 12 on the moving direction 326, so as to set the external screen 20 as an extending screen extending out from the edge 44 of the touch screen 12. In this way, the window management module 146 can display the window 42 on the external screen 20.

On the other hand, the window management module 146 also displays the window management panel 46 on the touch screen 12 to facilitate the user controlling the window 42 displayed on the external screen 20 through the window management panel 46. In the example of FIG. 4, the window management panel 46 can be hidden at the edge 44, and is only displayed as a representative icon. When the user wants to use the window management panel 46, the user can click, press, or drag the window management panel 46 to spread the window management panel 46, and then the user can click or drag a button or an icon displayed in the window management panel 46 to manage and operate the window 42 displayed on the external screen 20.

Figure 5:
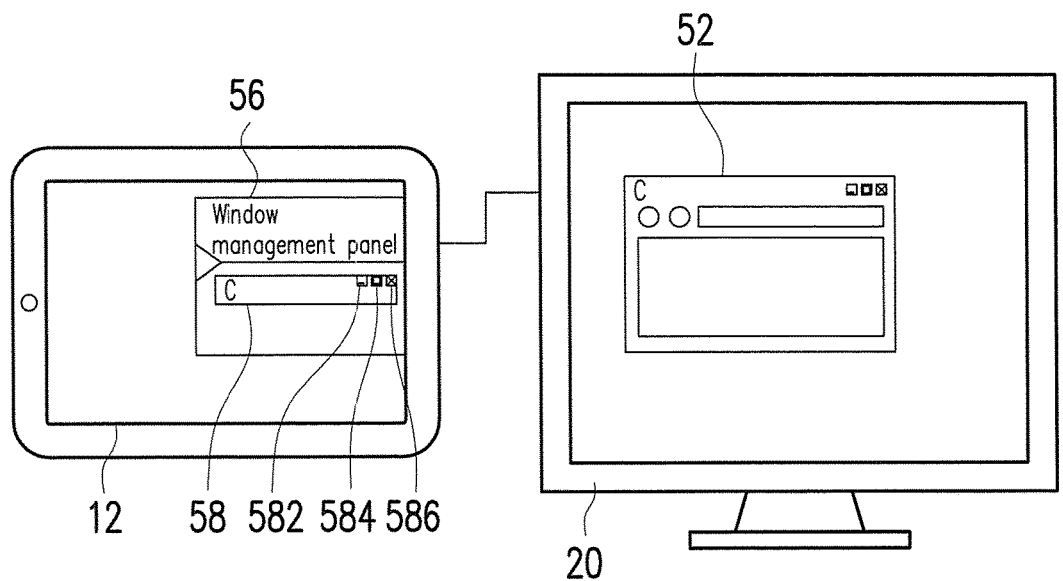
FIG. 5 is an example of the method for window management of multiple screens according to an embodiment of the invention.

Further, the spread window management panel can be presented in a form as that shown in FIG. 5. Referring to FIG. 4 and FIG. 5, the user can touch the window management panel 46 located at the edge 44 of the touch screen 12 and drag the same leftwards to spread the window management panel 46 as a window management panel 56. In other embodiments, the user can also perform a touch operation such as click, double click or long press on the window management panel to spread the window management panel 56, and the operation gesture is not limited by the invention. The window management panel 56 of FIG. 5 includes a window icon 58 corresponding to the window 52 moved to the external screen 20. The user can perform a touch operation on the window icon 58 to correspondingly control the window 52.

It should be noticed that the window management panel can be hidden and spread for the user to perform operations. In other embodiments, the window management panel can be directly presented on the touch screen 12 in a spreading form. Moreover, a size of the window management panel can also be adjusted according to user's requirement, and the configuration pattern of the window management panel on the touch screen 12 is not limited by the invention. Regarding the window icon used for controlling the window on the external screen, a configuration pattern such as a size or a position of the window icon in the window management panel is not limited by the invention.

It should be noticed that, in an embodiment, by displaying the window management panel at the edge adjacent to the external screen, the user can learn an orientation of the external screen relative to the touch screen 12 according to the position of the window management panel in the touch screen 12. For example, in the embodiment of FIG. 3, the window management panel 46 is displayed at the right side edge of the touch screen 12. In this way, when the user wants to move the other window in the touch screen 12 to the external screen 20 for displaying, the user is only required to drag the window towards the direction of the window management panel, and the window is moved to the external screen 20.

Then, referring back to the flow of FIG. 2, after the window management module 146 moves the window to the external screen for displaying, and displays the window management panel on the touch screen, the control module 148 receives a second touch operation performed by the user on the window icon, and accordingly controls the window moved to the external screen (step S208). The second touch operation can be a single click operation, a double click operation, a long press operation or a drag operation executed by a single finger or multiple fingers, which is not limited by the invention. In detail, in an embodiment, the window icon may include a plurality of control buttons, and the user can perform operations on the control buttons to correspondingly control the window moved to the external screen. Moreover, in an embodiment, the user can move the window back to the touch screen from the external screen by dragging the window icon from the inside of the window management panel to the outside of the window management panel. In another embodiment, the user can adjust a relative position of the window in the external screen by dragging the window icon around within the window management panel. Regarding the above various situations, a plurality of embodiments are provided below to describe how to control the window in the external screen through the second touch operation performed in the window management panel.

A situation of controlling the window by using the control buttons in the window icon is first described. Referring to FIG. 5 again, in an embodiment, the window icon 58 in the window management panel 56 includes a plurality of control buttons used for controlling the window 52 (for example, control buttons 582, 584 and 586 in FIG. 5). In this way, the control module 148 receives a selection operation performed by the user on one of the control buttons in the window icon, and executes a control function corresponding to the selected control button to the window 52 displayed on the external screen. The control buttons 582, 584 and 586 can respectively correspond to control operations of minimization, zoom in, zoom out, or closing, etc. In other embodiments, the control button can also correspond to other control functions, for example, a control function of moving the window or moving the window back to the touch screen 12, etc., so as to control the window 52 displayed on the external screen. Types of the control buttons included in the window icon 56 and the corresponding control functions thereof are not limited by the invention.

Then, a situation of using a drag operation performed on the window icon to implement moving the window from the external screen to the touch screen for displaying is described below. In detail, in an embodiment, the control module 148 receives a first drag operation for dragging the window icon from the inside of the window management panel to the outside of the window management panel, and accordingly moves the window back to the touch screen from the external screen. In other words, the window management panel of the present embodiment corresponds to a display range of the external screen, and the operation of dragging the window icon to the outside of the window management panel corresponds to the operation of the user moving the window in the external screen back to the touch screen for displaying.

Figure 6:
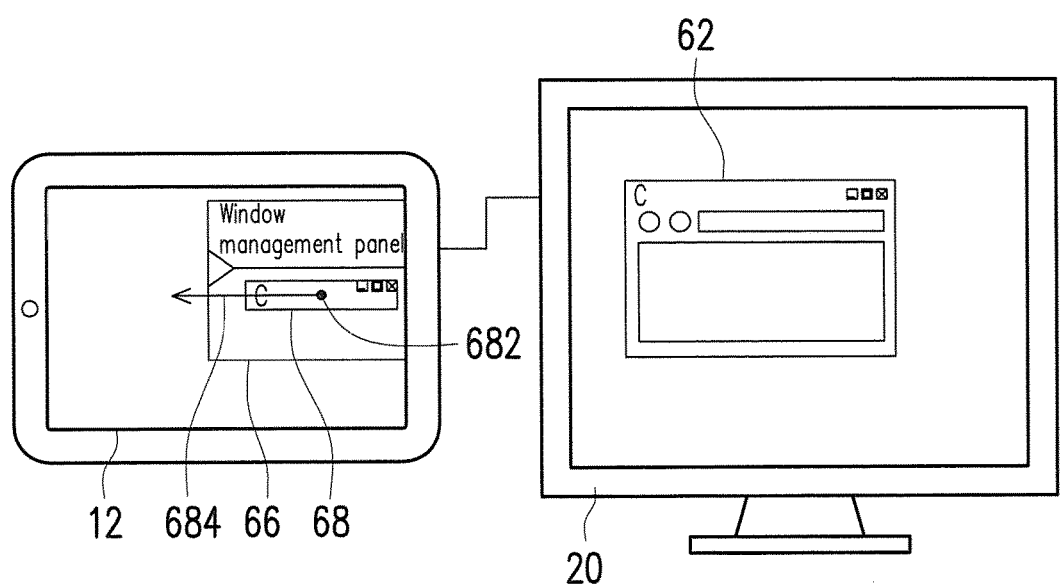
FIG. 6 is an example of the method for window management of multiple screens according to an embodiment of the invention.

For example, referring to FIG. 6, when the user wants to move a window 62 back to the touch screen 12 for displaying, the user can drag a window icon 68 out of a range of a window management panel 66. As shown in FIG. 6, a touch point 682 is a position where the user clicks the window icon 68, a direction of an arrow 684 corresponds to a dragging direction of the user's gesture, and an outer frame of the window management panel 66 corresponds to the window displayed on the external screen 20. In other words, when the control module 148 determines that the dragging operation of the user drags the window icon 68 out of the window management panel 66, the control module 148 determines that the user wants to move the window 62 back to the touch screen 12, and accordingly moves the window 62 back to the touch screen 12 for displaying.

Moreover, through the dragging operation performed on the window icon, the user can further adjust a relative position of the window in the external screen. Similar to the aforementioned embodiment, the window management panel of the present embodiment also corresponds to a display range of the external screen. When the user drags the window icon within the window management panel, the control module 148 receives a second drag operation for dragging the window icon within the window management panel, and accordingly moves the window displayed on the external screen according to a dragging trajectory of the second dragging operation. It should be noticed that the dragging trajectory of the present embodiment should be within the window management panel, which is different to the first drag operation of the aforementioned embodiment (i.e. the operation of dragging the window icon out of the window management panel, so as to move the window back to the touch screen). Moreover, regarding the implementation of dragging the window icon to correspondingly move the window displayed on the external screen, in the present embodiment, the size of the window management panel can be further adjusted to facilitate the user accurately moving the window icon, so as to control the relative position of the window on the external screen.

It should be noticed that regarding the control operation performed through the window management panel on the window displayed on the external screen, besides the implementations described in the aforementioned embodiments, in other embodiments, the above control operation can also be implemented by combining a plurality of touch operations performed on the window icon, or implemented through other variations of the touch operation. Taking a combination of the control button and the dragging operation for moving the window as an example, the user can click a control button for maximizing the window, namely, now the window management panel fills the entire touch screen. When the window management panel is maximized, the user can accurately control and drag the window icon to a position in the window management panel, so as to correspondingly move the relative position of the window displayed on the external screen. In this way, the user can control the window displayed on the external screen through the touch operations performed on the window management panel and/or a combination thereof, so as to achieve window management of the external screen.

Figure 7:
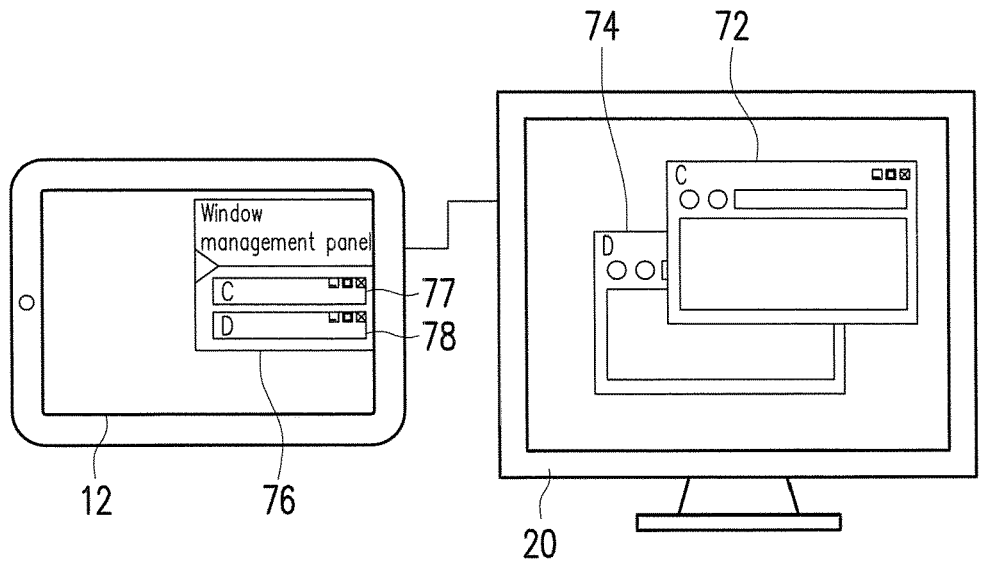
FIG. 7 is an example of the method for window management of multiple screens according to an embodiment of the invention.

It should be noticed that, in the aforementioned embodiment, the situation that one window is moved to the external screen is described, and when the user wants to move a plurality of windows to the external screen for displaying, the user can also implement control of the multiple windows through the window management panel. For example, FIG. 7 is an example illustrated according to an embodiment of the invention. The external screen 20 includes windows 72 and 74 respectively corresponding to window icons 77 and 78 in a window management panel 76 displayed on the touch screen 12. Similar to the aforementioned embodiment, the window icons 77 and 78 may also include a plurality of control buttons for receiving the touch operations of the user to correspondingly control the windows 72 and 74 on the external screen. Moreover, the user can also respectively manage the windows displayed on the external screen through dragging, clicking or other touch operations described in the aforementioned embodiments. It should be noticed that the window icons in the window management panel may have different configurations according to different requirements, which is not limited by the invention.

Moreover, in some cases, when multiple windows are displayed on the external screen, the windows are probably overlapped. Therefore, the embodiment of the invention also provides an implementation for correspondingly adjusting a display sequence of the windows. For example, in the embodiment of FIG. 7, the window 74 is located under the window 72. Now, if the users wants to look up the content of the window 74, the user can perform a touch operation on the window icon 77 (for example, click the window icon 77) to display the window 74 on the top layer of the windows on the external screen 20. Moreover, regarding a display mode of each of the window icons, an anti-white effect, an embossed effect or a shadow effect can be used to distinguish whether the window is on the top layer to facilitate the user's operation. Those skilled in the art may provide different touch manners to implement the operation of displaying the window on the top layer, and the window icon corresponding to the window on the top layer may also have different display modes, which is not limited by the invention.

In this way, according to the method for window management of multiple screens of the invention, the user can move one or a plurality of windows from the touch screen to the external screen for displaying, and can intuitively use the window icons in the window management panel displayed on the touch screen to control the corresponding windows on the external screen, so as to switch the touch screen and the external screen to display the windows, and adjust configurations of the windows on the external screen such as zoom in, zoom out or moving, or adjust a display sequence of the windows on the external screen to implement window management of multiple screens.

According to the aforementioned embodiments, the situation that the touch screen is connected to one external screen is introduced. Regarding a situation that the touch screen is connected to a plurality of external screens, the embodiment of the invention also provides a corresponding implementation method, and by using screen management panels corresponding to the screens, the electronic apparatus 10 can implement better window management on multiple external screens. An embodiment is provided below for detailed descriptions.

Figure 8:
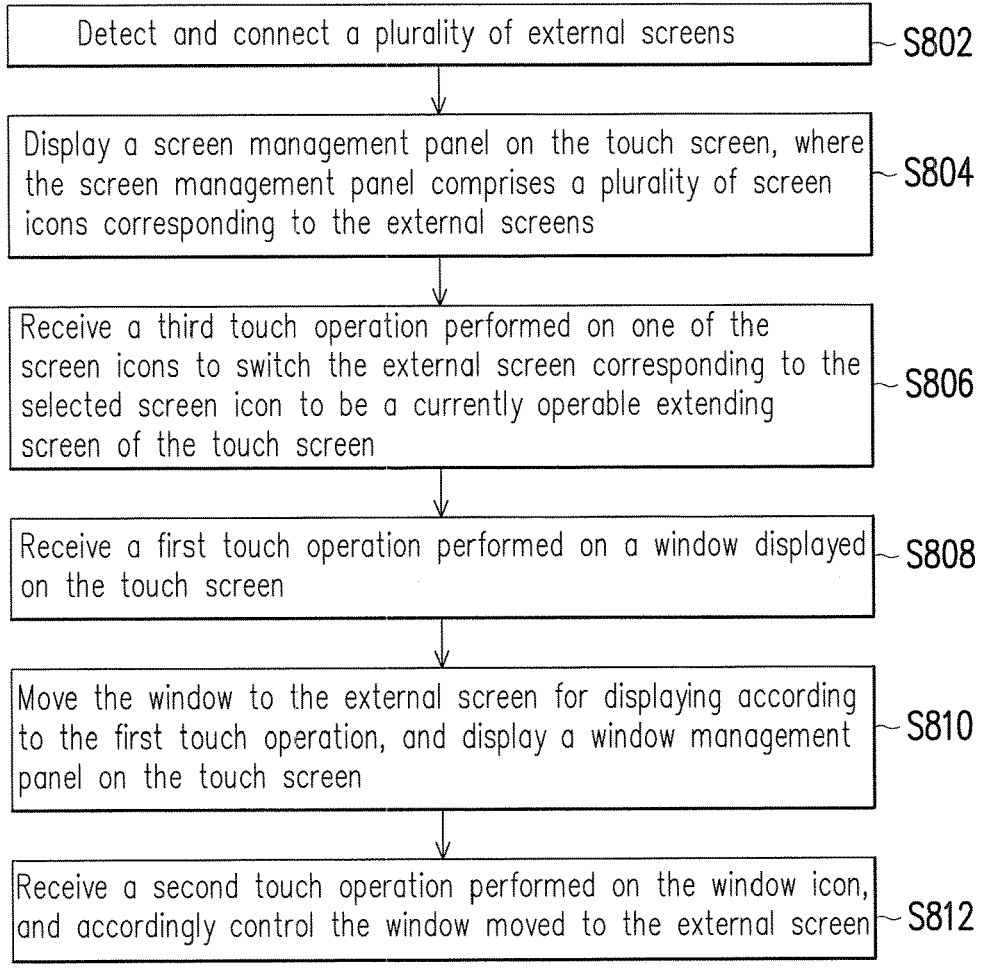
FIG. 8 is a flowchart illustrating a method for window management of multiple screens according to an embodiment of the invention.

FIG. 8 is a flowchart illustrating a method for window management of multiple screens according to an embodiment of the invention. Referring to FIG. 1 and FIG. 8, the method of the present embodiment is adapted to the aforementioned electronic apparatus 10, and in the present embodiment, the electronic apparatus 10 further includes a screen management module 141 (not shown). A detailed flow of the method of the embodiment is introduced below with reference of various components of the electronic apparatus 10 of FIG. 1.

First, the connection module 142 detects and connects a plurality of external screens (step S802). Then, the screen management module 141 displays a screen management panel on the touch screen 12, where the screen management panel includes a plurality of screen icons corresponding to the external screens (step S804). The screen management module 141 receives a third touch operation performed by the user on one of the screen icons, and switches the external screen corresponding to the screen icon selected by the user to be a currently operable extending screen of the touch screen 12 (step S806), where the screen management panel can be displayed at the edge of the touch screen 12 that is the same or opposite to that of the window management panel, which is not limited by the invention. The third touch operation may include a single click operation, a double click operation, a long press operation, or a drag operation executed by a single finger or multiple fingers, and has a similar operation form with that of the second touch operation, which is not limited by the invention.

Figure 9:
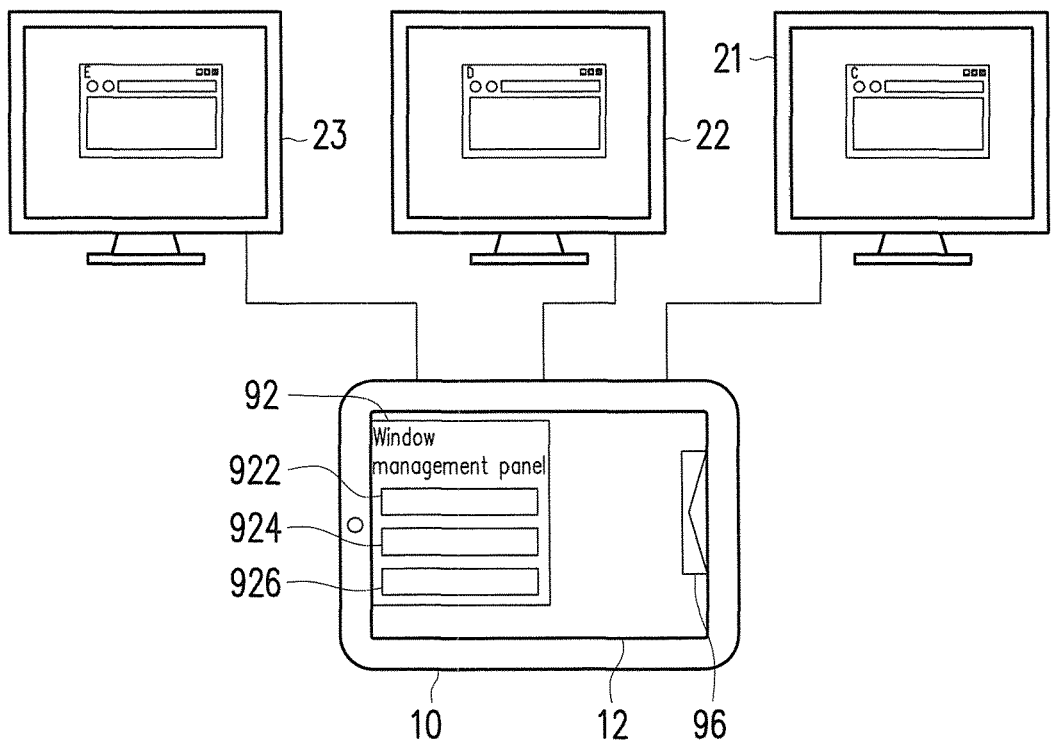
FIG. 9 is an example of the method for window management of multiple screens according to an embodiment of the invention.

For example, FIG. 9 is an example of the method for window management of multiple screens according to an embodiment of the invention. Referring to FIG. 9, in the present embodiment, when the connection module 142 detects that the electronic apparatus 10 is connected to the external screens 21, 22 and 23, the screen management module 141 can display a screen management panel 92 on the touch screen 12 to manage the external screens. As shown in FIG. 9, the screen management panel 92 can be displayed at the edge opposite to that of a window management panel 96. In other embodiments, the screen management panel 92 can also be displayed at the edge that is the same as that of the window management panel 96, or displayed at other positions on the touch screen 12, and the display position of the screen management panel is not limited by the invention.

To be specific, in the present embodiment, the screen management module 141 displays screen icons 922, 924 and 926 corresponding to the external screens 21, 22 and 23 in the screen management panel 92 to facilitate the user setting the external screen corresponding to the screen icon selected by the user to be the currently operable extending screen of the touch screen 12 through the third touch operation performed on the screen icon. For example, the electronic apparatus 10 can detect and connect the external screens 21, 22 and 23 in an initial state, and preset the external screen 21 to be the currently operable extending screen of the touch screen 12. Now, when the user performs the aforementioned touch operation on the window displayed on the touch screen 12, the window is moved to the external screen 21 for displaying. After the user clicks the screen icon 924, the screen management module 141 sets the external screen corresponding to the screen icon 924 as the currently operable extending screen of the touch screen 12. Namely, the user can determine the currently operable extending screen by clicking the corresponding screen icon in the screen management panel, and after the extending screen is determined, the subsequent operations performed on the window displayed on the touch screen 12 are executed on the selected extending screen. It should be noticed that during the process that the user controls the window displayed on the external screen, the user can still switch the extending screen corresponding to the touch screen 12 at any time according to an actual requirement, and can move the windows on the touch screen 12 to one or a plurality of extending screens for displaying in a one-to-one manner or one-to-plural manner.

Referring back to the flow of FIG. 8, after the screen management module 141 receives the third touch operation through the screen management panel, and accordingly switches and selects the extending screen to be used by the touch screen 12, the receiving module 144 receives the first touch operation performed on the window displayed on the touch screen 12 (step S808). The window management module 146 can move the window to the external screen corresponding to the extending screen of the touch screen for displaying according to the first touch operation, and displays the window management panel on the touch screen 12 (step S810). The control module 148 receives the second touch operation executed by the user on the window icon, and accordingly controls the window moved to the external screen (step S812), where the steps S808-S812 are similar to the steps S204-S208, and details of the steps can refer to the aforementioned descriptions.

In this way, when the electronic apparatus 10 is connected to a plurality of external screens, the user can enable one or a plurality of the external screens to serve as the extending screen of the touch screen according to an actual requirement through the screen management panel. Moreover, the user can further operate and control the window displayed on each of the external screens through the window management panel. In this way, window management of multiple external screens connected to the touch screen can be realized.

Besides the implementation of selecting the currently operable extending screen from the external screens for the touch screen (i.e. at a same time, operations can only be performed on the selected extending screen), in another embodiment, the external screens can respectively serve as extending screens of the touch screen on different extending directions, and the external screen where the window on the touch screen is moved to is determined according to the moving direction of the touch operation of the user (i.e. at the same time, operations can be performed on a plurality of extending screens).

In detail, similar to the aforementioned embodiment, the window management module 146 can display an extending screen setting menu for the user to select or set an extending direction of each of the external screens relative to the touch screen 12. Alternatively, the window management module 146 can also determine the extending direction of the external screen relative to the touch screen 12 according to a moving direction of the touch operation performed by the user for the first time on the window displayed on the touch screen 12 after the screen management module 141 determines the currently operable extending screen (i.e. external screen) according to the touch operation of the user on the screen icon. In this way, when the receiving module 144 receives a touch operation performed by the user on the other window on the touch screen 12 afterwards, according to the moving direction of the touch operation, the window management module 146 can move the window to the external screen corresponding to the above moving direction for displaying. For example, when the user drags the window displayed on the touch screen 12 leftwards for more than a predetermined distance, the window is moved to the extending screen located at the left side for displaying. When the user drags the window displayed on the touch screen 12 rightwards for more than the predetermined distance, the window is moved to the extending screen located at the right side for displaying. In this way, the user can operate the windows on the touch screen 12 and the external screens through a more intuitive manner.

On the other hand, besides implementing the window management of multiple screens through the aforementioned two operation interfaces of the screen management panel and the window management panel, the invention further provides a window management panel which integrates both screen management function and window management function, and based on the integrated window management panel, the user can directly implement screen switch and window control by using a single operation interface, so as to further improve operation convenience of the window management panel, and details thereof are described below.

Figure 10:
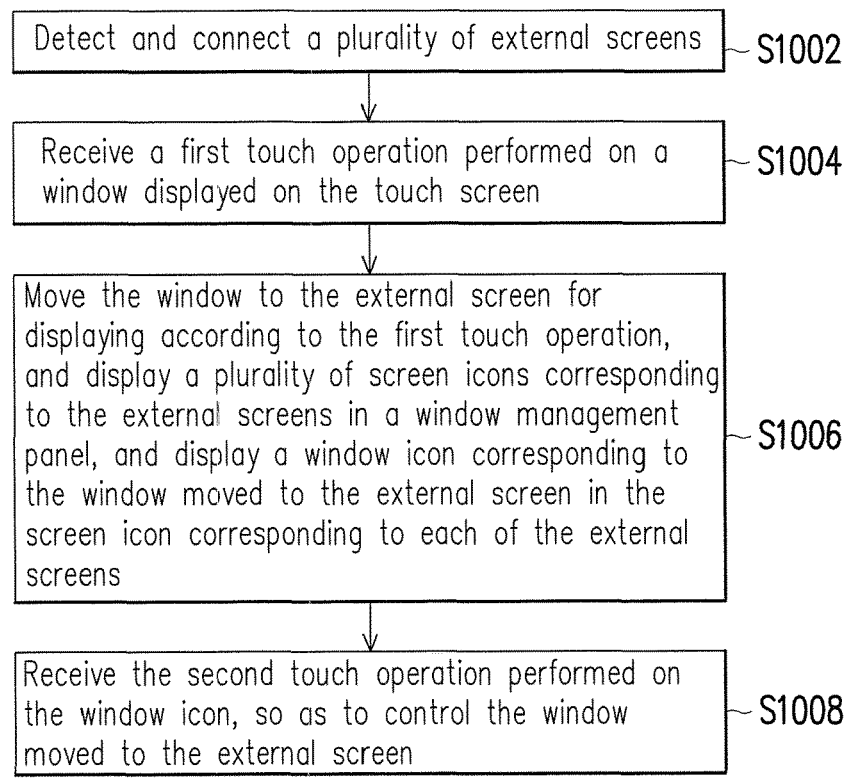
FIG. 10 is a flowchart illustrating a method for window management of multiple screens according to an embodiment of the invention.

FIG. 10 is a flowchart illustrating a method for window management of multiple screens according to an embodiment of the invention. Referring to FIG. 1 and FIG. 10, the method of the present embodiment is adapted to the aforementioned electronic apparatus 10, and a detailed flow of the method of the present embodiment is described below with reference of various components of the electronic apparatus 10 of FIG. 1.

First, the connection module 142 detects and connects a plurality of external screens (step S1002). Then, the receiving module 144 receives the first touch operation performed on the window displayed on the touch screen 12 (step S1004), where the steps S1002, S1004 are similar to the steps S802, S808 of the aforementioned embodiment, and details thereof may refer to the aforementioned descriptions.

A difference between the present embodiment and the aforementioned embodiment is that in the present embodiment, the window management module 146 can move the window to the external screen for displaying according to the first touch operation, and displays a plurality of screen icons corresponding to the external screens in the window management panel, and displays a window icon corresponding to the window moved to the external screen in the screen icon corresponding to each of the external screens (step S1006). Namely, the window management module 146 displays the screen icons corresponding to all of the detected external screens for receiving the selection of the external screen from the user, and determining the external screen currently used as the extending screen of the touch screen, and the user can perform operation on the window icon displayed in the screen icon through touch control, so as to control the window displayed in the selected external screen (i.e. the extending screen of the touch screen). In this way, the screen icons and the window icons are all displayed in the window management panel to facilitate the user controlling the window displayed on each of the extending screens through the window management panel, so as to make window management of multiple screens more convenient in operation.

Finally, the control module 148 receives the second touch operation performed by the user on the window icon, so as to control the window moved to the external screen (step S1008). The step S1008 is similar to the step S812, so that details thereof can refer to the aforementioned descriptions. An embodiment is provided below to describe the integrated window management panel.

Figure 11:
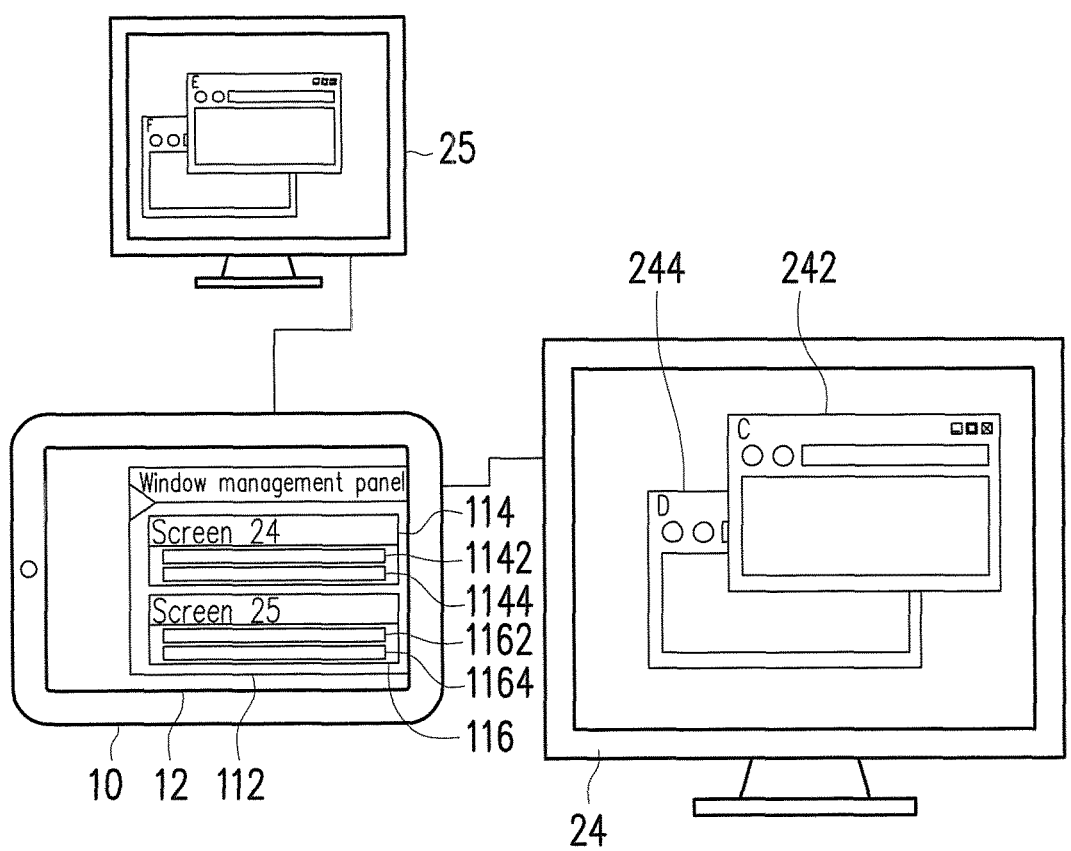
FIG. 11 is an example of the method for window management of multiple screens according to an embodiment of the invention.

FIG. 11 is an example of a window management panel according to an embodiment of the invention. The window management panel 112 of FIG. 11 includes screen icons 114, 116 and window icon 1142, 1144, 1162 and 1164, where the screen icons 114 and 116 respectively correspond to external screens 24 and 25. In the present embodiment, when the user wants to switch the extending screen currently connected to the electronic apparatus 10 to the external screen 24, the user can perform a touch operation on the screen icon 114 (for example, click the top of the screen icon 114) to switch the currently operable extending screen of the touch screen 12 to the external screen 24. Now, if the user wants to control a window 242 displayed on the external screen 24 (for example, to adjust a size of the window, move or close the window or display the window on the top layer, etc.), the user can perform a corresponding touch operation on the window icon 1142 displayed in the screen icon 114 to implement control of the window 242 through the window management panel 112. The above touch operation is similar as that described in the aforementioned embodiment, so that details thereof are not repeated. It should be noticed that the window icons and the screen icons illustrated in FIG. 11 and configuration of the window icons and the screen icons in the window management panel are only an implementation pattern of the integrated window management panel of the invention, and those skilled in the art may use different configurations of the window icons and the screen icons according to an actual layout requirement of the window management panel, and the scope of the invention is met as long as the external screen and the displayed window are controlled through the window management panel.

Therefore, in the present embodiment of the invention, by integrating the screen management panel and the window management panel, the user can use a single operation interface to correspondingly control a plurality of external screens serving as the extending screens of the touch screen, and can control each of the windows moved to the corresponding extending screen, such that the user can conveniently perform window management of multiple screens.

The invention further provides a computer readable medium, which stores a computer program to be loaded to an electronic apparatus to execute various steps of the aforementioned method for window management of multiple screens. The computer program is composed of a plurality of program instructions (for example, an organization chart establishing program instruction, a table approving program instruction, a setting program instruction, and a deployment program instruction, etc), and these program instructions are loaded into the electronic apparatus and executed by the same to accomplish various steps of the aforementioned method for window management of multiple screens.

In summary, in the method, the apparatus and the computer readable medium for window management of multiple screens, the window is moved to and displayed on the external screen through the touch operation, and the window displayed on the external screen is controlled through the window management panel in the touch screen. Moreover, when the touch screen is connected to a plurality of extending screens, the user can also switch the extending screens through touch operation, and control and manage the window displayed on each of the extending screens. In this way, the touch technique can be used to simply and intuitively implement window management of the external screens, so as to improve the user's operation experience.

It will be apparent to those skilled in the art that various modifications and variations can be made to the structure of the invention without departing from the scope or spirit, of the invention. In view of the foregoing, it is intended that the invention cover modifications and variations of this invention provided they fall within the scope of the following claims and their equivalents.

What is claimed is:

1. A method for window management of multiple screens, adapted to an electronic apparatus having a touch screen which displays a first display area, the method comprising:
   detecting and connecting an external screen;
   receiving a first touch operation performed on a first window displayed on the first display area of the touch screen;
   determining an extending direction of the first display area of the touch screen according to a moving direction of the first touch operation;
   setting a second display area displayed on the external screen as an extending display area extending out from an edge of the first display area corresponding to the extending direction;
   moving at least in part of the first window to the second display area of the external screen for displaying according to the moving direction of the first touch operation; and
   displaying a window management panel comprising a first draggable window icon corresponding to the first window at the edge of the first display area of the touch screen in response to that the at least in part of the first window is moved to the second display area;
   receiving a second touch operation performed on the first draggable window icon, and accordingly controlling the first window moved to the second display area of the external screen;
   receiving a forth touch operation performed on a second window displayed on the first display area of the touch screen;
   moving at least in part of the second window to the second display area of the external screen for displaying according to the moving direction of the forth touch operation;
   displaying a second draggable window icon corresponding to the second window in the window management panel in response to that the at least in part of the second windows is moved to the second display area;
   receiving a first drag operation for dragging the first draggable window icon from the inside of the window management panel to the outside of the window management panel; and
   correspondingly moving back the first window from the second display area of the external screen to the first display area of the touch screen according to the first drag operation.

2. The method for window management of multiple screens as claimed in claim 1, wherein the first draggable window icon comprises a plurality of control buttons used for controlling the first window, and the step of receiving the second touch operation performed on the first draggable window icon, and accordingly controlling the window moved to the second display area of the external screen comprises:
   receiving a selection operation performed on one of the control buttons in the first draggable window icon; and
   executing a control function corresponding to the selected control button to the first window.

3. The method for window management of multiple screens as claimed in claim 2, wherein the control function comprises minimization, zoom in, zoom out, moving or closing.

4. The method for window management of multiple screens as claimed in claim 1, wherein the step of receiving the second touch operation performed on the first draggable window icon, and accordingly controlling the first window moved to the second display area of the external screen comprises:
   receiving a second drag operation for dragging the first draggable window icon within the window management panel; and
   correspondingly moving the first window according to a dragging trajectory of the second drag operation.

5. The method for window management of multiple screens as claimed in claim 1, further comprising:
   detecting and connecting a plurality of external screens;
   displaying a screen management panel on a first display area of the touch screen, wherein the screen management panel comprises a plurality of screen icons corresponding to the external screens; and
   receiving a third touch operation performed on one of the screen icons to switch the external screen corresponding to the selected screen icon to be a currently operable extending display area of the touch screen, wherein the screen management panel is displayed at an edge of the first display area of the touch screen that is the same or opposite to that of the window management panel.

6. The method for window management of multiple screens as claimed in claim 1, wherein the step of detecting and connecting the external screen further comprises detecting and connecting a plurality of external screens, and the step of moving the first window to the second display area of the external screen for displaying according to the first touch operation and displaying the window management panel at the edge of the first display area of the touch screen comprises:
   displaying a plurality of screen icons corresponding to the external screens in the window management panel, and displaying the first draggable window icon corresponding to the first window moved to the second display area of the external screen in the screen icon corresponding to each of the external screens.

7. The method for window management of multiple screens as claimed in claim 1, wherein the step of receiving the first touch operation performed on the first window displayed on the touch screen comprises:

receiving the first touch operation performed to a title bar, a state bar, an edge, a corner or a function button of the first window displayed on the first display area of the touch screen.

8. The method for window management of multiple screens as claimed in claim 1, wherein the first touch operation comprises a single click operation, a double click operation, a long press operation or a drag operation executed by a single finger or multiple fingers.

9. An electronic apparatus, comprising:
a touch screen, displaying a first display area;
a storage unit, recording a plurality of modules; and
a processing unit, coupled to the touch screen and the storage unit, and accessing and executing the modules recorded in the storage unit, the modules comprising:
  a connection module, detecting and connecting an external screen;
  a receiving module, receiving a first touch operation and a forth touch operation respectively performed on a first window and a second window, wherein the first window and the second window are displayed on the first display area of the touch screen;
  a window management module, determining an extending direction of the first display area of the touch screen according to a moving direction of the first touch operation, setting a second display area displayed on the external screen as an extending display area extending out from an edge of the first display area corresponding to the extending direction,
  the window management module moving at least in part of the first window to the second display area of the external screen for displaying according to the moving direction of the first touch operation, and
  the window management module displaying a window management panel at the edge of the first display area of the touch screen in response to that the at least in part of the first window is moved to the second display area, wherein the window management panel comprises a first draggable window icon corresponding to the first window moved to the second display area of the external screen,
  the window management module moving at least in part of the second window to the second display area of the external screen for displaying according to the moving direction of the forth touch operation, and
  the window management module displaying a second draggable window icon corresponding to the second window in the window management panel in response to that the at least in part of the second windows is moved to the second display area; and
  a control module, receiving a second touch operation performed on the window icon, and accordingly controlling the window moved to the second display area of the external screen,
  the control module receiving a first drag operation for dragging the first draggable window icon from the inside of the window management panel to the outside of the window management panel, and correspondingly moves back the first window from the second display area of the external screen to the first display area of the touch screen.

10. The electronic apparatus as claimed in claim 9, wherein the first draggable window icon comprises a plurality of control buttons used for controlling the first window, and the control module receives a selection operation performed on one of the control buttons in the first draggable window icon, and executes a control function corresponding to the selected control button to the first window.

11. The electronic apparatus as claimed in claim 10, wherein the control function comprises minimization, zoom in, zoom out, moving or closing.

12. The electronic apparatus as claimed in claim 9, wherein the control module receives a second drag operation for dragging the first draggable window icon within the window management panel, and correspondingly moves the first window according to a dragging trajectory of the second drag operation.

13. The electronic apparatus as claimed in claim 9, wherein the connection module further detects and connects a plurality of external screens, the modules further comprise a screen management module to display a screen management panel on the first display area of the touch screen, wherein the screen management panel comprises a plurality of screen icons corresponding to the external screens, and receives a third touch operation performed on one of the screen icons to switch the external screen corresponding to the selected screen icon to be a currently operable extending display area of the touch screen, wherein the screen management panel is displayed at an edge of the first display area of the touch screen that is the same or opposite to that of the window management panel.

14. The electronic apparatus as claimed in claim 9, wherein the connection module further detects and connects a plurality of external screens, and the window management module displays a plurality of screen icons corresponding to the external screens in the window management panel, and displays the first draggable window icon corresponding to the first window moved to the second display area of the external screen in the screen icon corresponding to each of the external screens.

15. The electronic apparatus as claimed in claim 9, wherein the receiving module receives the first touch operation performed to a title bar, a state bar, an edge, a corner or a function button of the first window displayed on the first display area of the touch screen.

16. The electronic apparatus as claimed in claim 9, wherein the first touch operation comprises a single click operation, a double click operation, a long press operation or a drag operation executed by a single finger or multiple fingers.

17. A non-transitory computer readable medium, storing programs to be loaded to an electronic apparatus to execute these following steps:
  detecting and connecting an external screen;
  receiving a first touch operation performed on a first window displayed on a first display area of a touch screen of the electronic apparatus;
  determining an extending direction of the first display area of the touch screen according to a moving direction of the first touch operation;
  setting a second display area displayed on the external screen as an extending display area extending out from an edge of the first display area corresponding to the extending direction;
  moving at least in part of the first window to the second display area of the external screen for displaying according to the moving direction of the first touch operation; and
  displaying a window management panel at the edge of the first display area of the touch screen in response to that the at least in part of the first window is moved to the second display area, wherein the window management panel comprises a first draggable window icon corresponding to the first window moved to the second display area of the external screen;

receiving a second touch operation performed on the first draggable window icon, and accordingly controlling the first window moved to the second display area of the external screen;

receiving a forth touch operation performed on a second window displayed on the first display area of the touch screen;

moving at least in part of the second window to the second display area of the external screen for displaying according to the moving direction of the forth touch operation;

displaying a second draggable window icon corresponding to the second window in the window management panel in response to that the at least in part of the second windows is moved to the second display area;

receiving a first drag operation for dragging the first draggable window icon from the inside of the window management panel to the outside of the window management panel; and correspondingly moving back the first window from the second display area of the external screen to the first display area of the touch screen according to the first drag operation.

* * * * *